J. A. REMER.
Malt Dryer.
No. 111,569.
Patented Feb. 7, 1871.
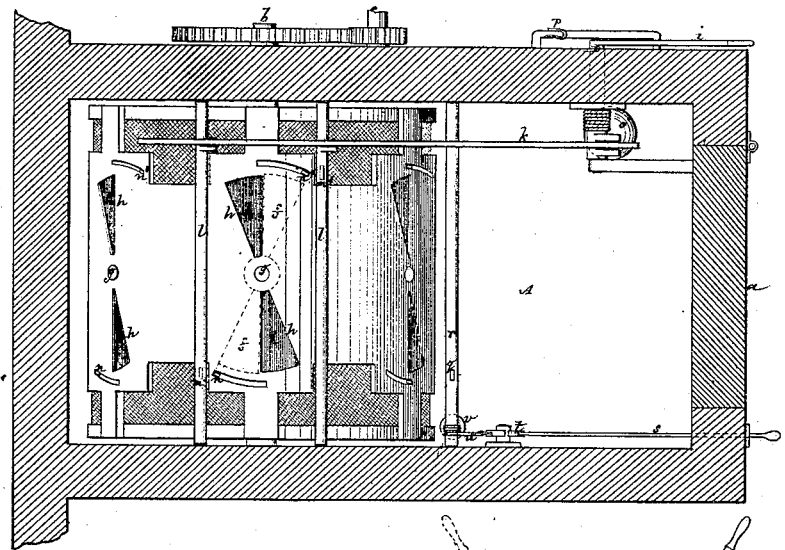
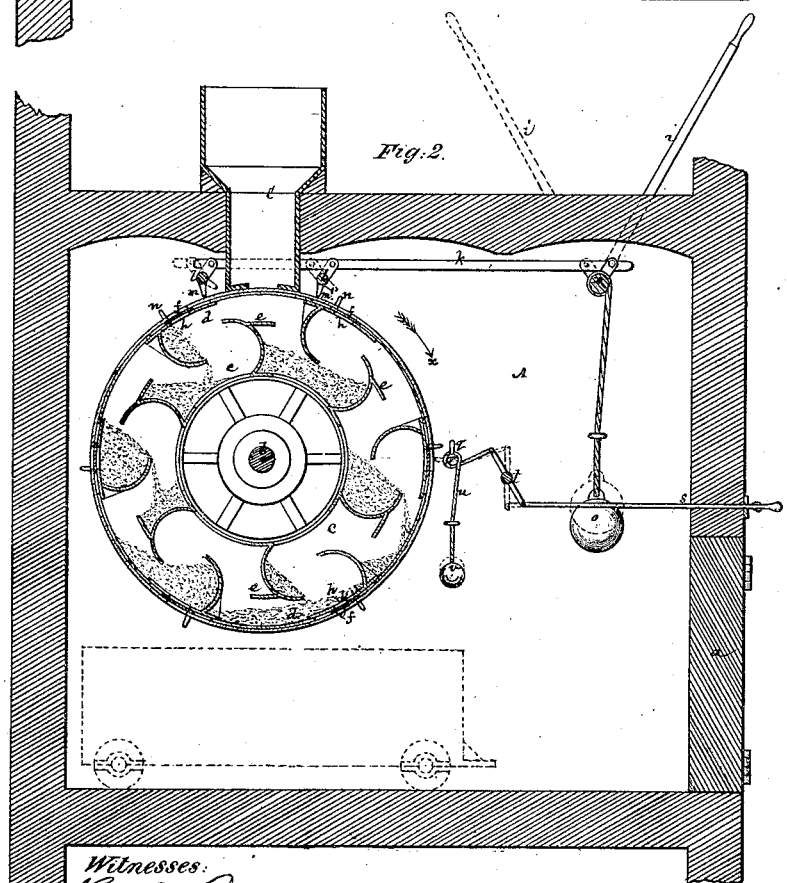

United States Patent Office.

JOHN A. REMER, OF NEW YORK, N. Y., ASSIGNOR TO HIMSELF AND HENRY ASSENHEIMER, OF SAME PLACE.

Letters Patent No. 111,569, dated February 7, 1871.

IMPROVEMENT IN KILNS FOR DRYING MALT.

The Schedule referred to in these Letters Patent and making part of the same.

*To all whom it may concern:*

Be it known that I, JOHN A. REMER, of the city, county, and State of New York, have invented a new and useful Improvement in Kilns for Drying Malt and other substances, of which the following is a full, clear, and exact description, reference being had to the accompanying drawing forming part of this specification, and in which—

Figure 1 represents a sectional plan of a malt-kiln constructed in accordance with my improvement, and Figure 2, a vertical section of the same, taken transversely through the axis of the drying device.

Similar letters of reference indicate corresponding parts.

My invention consists in a rotary drier of annular form, and in which the one or both of the peripheries are mainly of a perforated or screen-like construction, as may also be its sides, said cylinder revolving in a heated chamber, and serving by its annular construction to more thoroughly agitate and expose the substance to be dried than an entire cylinder is capable of doing.

The invention also includes a combination of inner and outer buckets within an annular revolving drier, whereby the malt or substance being dried is not only effectually agitated, but kept separated, as regards bulk, and tossed to and fro between the buckets during their rotation in common.

The invention likewise consists in a combination of opening-and-closing mechanism with a system or series of valves arranged on the outer periphery of the revolving drier, for automatically opening and closing inlets and outlets, with which the drier is provided, to effect the admission to and discharge therefrom of the malt or substance under treatment.

In the accompanying drawing—

A represents a room or chamber designed to be heated in any suitable manner, and provided with a door, *a*.

B is the revolving drier secured to a horizontal shaft, *b*, which may be driven by gearing from a primary shaft. This drier is of annular form with its outer periphery or outer and inner peripheries, as also, if desired, its sides perforated or of screen-like construction.

Said perforated annular drier it is furthermore preferred to construct with inner and outer buckets *c* and *d*, arranged in alternate relation around the two peripheries on the inside of the drier, and preferably of reverse curvilinear form at their ends, and with leaves or projections *e* on the exterior of the advance ends of the inner buckets, all as clearly represented in fig. 2.

The outer periphery of the drier is provided with inlets and outlets, controlled by gates or valves corresponding in number and arrangement to the outer row of buckets, for the purpose of charging each combined set of inner and outer buckets with the malt to be dried, and of discharging the same therefrom when required. These valves may be variously constructed, but they are here shown as double vibrating valves, *f*, swinging on centers, as at *g*, and controlling openings *h* in the drier.

C is a hopper for supplying the drier with malt by opening any or each of the valves *f*, as, in the rotation of the drier, they are brought under the hopper. The valves are then closed and remain so until the malt has been sufficiently dried, after which, and when they reach an undermost position, they are opened as required to effect the discharge from the buckets into a truck or receptacle run or placed under the drier for the purpose.

A leading peculiarity of this drier is its annular construction, which not only gives an extended surface exposure, but does away with any accumulation of the malt at the center of the drier, and secures a more perfect agitation of it accordingly.

Another peculiarity is its arrangement of inside-and-outside buckets, which, as the drier is rotated, serve to toss the malt from the inner to the outer buckets and back again, and to more perfectly distribute and agitate it. Malt may, by this rotary drier, be dried much more uniformly, rapidly, and with infinitely less labor than in a malt-house as heretofore done.

Combined with the gates or valves *f* is shown mechanism for automatically opening and closing them, or of keeping them opened or closed, as required. Thus, D is a rock-shaft operated by a handle, *i*. This rock-shaft, by means of a rod, K and suitable connections, serves to rock two counter-shafts, *l l*, arranged on opposite sides of the hopper, and accordingly as the handle *i* is thrown to the position represented for it by full and dotted lines, sets or adjusts toes *m m'* on the rock-shafts *l l*, so that they are either made to come in contact with or clear projections *n n'* on the valves *f*, as the drier B is rotated in the direction indicated by the arrow *x*. When the lever or handle *i* is moved to its position, shown in full lines, the toe *m* serves, as the projections *n* strike it, to open the valves to admit malt from the hopper as the openings *h* pass under the latter, and the toes *m'* afterward operate on the projections *n'* to close the valves. The revolving drier being thus charged with a certain quantity of malt in each set of buckets the lever *i* is shifted to the position shown by dotted lines, which puts the toes *m m'* out of contact with the projections *n n'*, thus causing the drier to rotate with its valves closed. A weight, *o*, attached by a cord to the rock-shaft D, serves to throw and hold said mechanism in its opening-and-closing position on the valves, and a spring, $p$, catching or bearing on the lever $i$, operates to hold said mechanism free of any action on the valves.

A somewhat similar mechanism may be used to open the valves when it is required to effect discharge from the drier, as, for instance, through a toe, $q$, on a lower rock-shaft, $r$, put into or out of striking position with the projections $n$ on the valves, accordingly as a sliding rod, $s$, is pressed in or out and through the intervention of a double-armed lever, $t$, and cord or chain, $u$, a weight, $v$, raised or lowered, said weight falling and holding the toe $q$ out of contact with the valves upon pressure being removed from the rod $s$.

What I claim as my invention, and desire to secure by Letters Patent, is—

1. A revolving and perforated annular drier, substantially as specified.

2. The combination of inner and outer buckets $c$ and $d$ with a revolving and perforated annular drier, essentially as described.

3. The combination, with the gates or valves arranged around the outer peripher of the revolving drier and with the buckets which said valves control, of mechanism for automatically opening and closing, when required, the valves as they pass under the hopper that supplies the drier, substantially as specified.

4. The combination and arrangement of the shifting device or toe $q$ and mechanism for controlling the same with the revolving drier B and its valves and buckets, essentially as and for the purpose herein set forth.

JNO. AUG. REMER.

Witnesses:
HENRY T. BROWN,
FRED. HAYNES.